United States Patent [19]

Sanders et al.

[11] Patent Number: 5,612,530
[45] Date of Patent: Mar. 18, 1997

[54] SCANNER WITH PRE-PROGRAMMED WORKING RANGES

[75] Inventors: Robert Sanders, Bayport; Altaf Mulla, Merrick; Michael Catalano, Lindenhurst, all of N.Y.

[73] Assignee: Symbol Technologies, Inc., Holtsville, N.Y.

[21] Appl. No.: 377,448

[22] Filed: Jan. 24, 1995

[51] Int. Cl.[6] .................................................. G06K 7/10
[52] U.S. Cl. .......................................... 235/462; 235/472
[58] Field of Search .................................. 235/462, 472, 235/454, 467

[56]  References Cited

U.S. PATENT DOCUMENTS

| 5,189,291 | 2/1993 | Siemiatkowski | 235/472 |
| 5,214,270 | 5/1993 | Rando | 235/472 |
| 5,237,161 | 8/1993 | Grodevant | 235/462 |
| 5,340,971 | 8/1994 | Rockstein et al. | 235/472 |
| 5,386,107 | 1/1995 | Dvorskis et al. | 235/472 |

Primary Examiner—John Shepperd
Assistant Examiner—Thien Minh Le
Attorney, Agent, or Firm—Kirschstein et al.

[57]  ABSTRACT

An optical scanner for reading indicia such as barcode symbols is usable in a first, hand-held mode and in a second, hands-free mode in which the scanner is mounted to a fixed stand. Switching means are provided so that when the scanner is lifted from the stand, for hand-held use, it automatically switches to a first working range, and when it is replaced onto the stand it automatically switches to a second, closer, working range. In the first working range, the software is optimised to read barcode symbols at a relatively long distance from the scanner; in the second working range the software is optimised to read barcode symbols which are relatively close to the scanner. The switching means may comprise any type of contact or non-contact switch such as a reed switch or a Hall effect switch.

20 Claims, 3 Drawing Sheets

SCANNER WITH PRE-PROGRAMMED WORKING RANGES

BACKGROUND OF THE INVENTION

1. Field of the Invention

The present invention relates generally to the optical scanning of indicia, particularly although not exclusively to barcode scanning. More particularly, the invention relates to a scanner which is suitable for use both in a fixed mode and in a hand-held mode.

2. Discussion of the Prior Art

Prior art barcode scanners and decoders have generally employed a fixed working range, which in some products is typically seven or eight inches. Under some operating conditions, a barcode which is not located within the defined working range can result in an erroneous decoding of the barcode, or alternatively multiple different decodes of the same barcode. Clearly, neither of these is acceptable as they are likely to result in erroneous data entries.

This lack of flexibility in many prior art scanners becomes particularly acute when the user needs to scan barcodes on a variety of different objects, some of which may be close to the scanner and some of which may be further away. At a supermarket point-of-sale, for example, most of the items to be scanned may easily be accessible to the checkout operator as they pass by on a checkout conveyor. However, occasional bulky items may not fit onto the conveyor and it may be inconvenient and perhaps very difficult to bring such items close enough to the scanner for the barcode symbol to be read.

In an effort to address this problem, U.S. Pat. No. 5,324,924, assigned to the same assignee as the present invention, describes an arrangement in which the user can selectively determine the working range of the barcode scanner. If the user attempts to scan a barcode symbol which is too far away to be read, the scanner indicates this fact, and the user then changes the working range by scanning a special control barcode symbol. The control barcode symbol instructs the scanner to use a different software routine, which is better optimized for scanning barcode symbols which are far away from the scanner.

A difficulty with such an arrangement is that the user has manually to scan the control barcode symbol whenever the working range is to be changed. This is somewhat inconvenient for the user, and, unless the user is experienced, can easily be forgotten, resulting in lower than optimal efficiency at the point-of-sale.

SUMMARY OF THE INVENTION

Accordingly, it is a primary object of the present invention to provide an optical scanner which at least alleviates the difficulties mentioned above.

It is an additional object of the present invention to provide a scanner which can be used both at short range, and at long range, without the user knowingly having to adjust the working range.

It is yet a further object to provide a scanner which is suitable for use both in hand-held mode, and hands-free mode, particularly although not exclusively by a checkout operator at a point-of-sale.

According to the present invention there is provided an optical scanner for scanning indicia having regions of differing light reflectivity, the scanner being usable in a first mode in which it is held in the hand of a user and in a second mode in which it is supported by a fixed support, the scanner comprising:

(a) a scanner body;

(b) scanning and decoding means for emitting a scanning light beam from the scanner body towards an indicia to be read, for receiving light reflected from the indicia and for decoding the indicia based on the said reflected light;

(c) mode detection means arranged automatically to determine whether the scanner is being used in the first mode or in the second mode; and (d) control means actuated by the mode detection means to optimize the scanning and decoding means to read the indicia in a first working range in the first mode and in a second working range in the second mode.

According to a second aspect of the present invention there is provided a method of scanning an indicia having regions of differing light reflectivity, the method being operable in a first mode in which a scanner is held in the hand of a user and in a second mode in which the scanner is supported by a fixed support, the method comprising:

(a) Emitting a scanning light beam from the scanner body towards an indicia to be read, receiving light reflected from the indicia and decoding the indicia based on the said reflected light;

(b) automatically determining whether the scanner is being used in the first mode or in the second; and (c) on the basis of the said determination, optimising the scanner for reading the indicia in a first working range in the first mode and in a second working range in the second mode.

In the preferred embodiment of the present invention, the control means optimize the scanner to read indicia at a first, relatively near, working range in the first mode and a second, relatively distant, working range in the second mode. In other embodiments, it would of course be possible for the first working range to be a relatively distant range and the second working range to be a relatively near range.

The means for detecting the mode may be a mechanical switch on the housing, or alternatively a convenient non-contact switch such as a reed switch or a Hall effect switch. The mode detection means could be sensitive either to the presence of the scanner on a stand, or to the act of placing the scanner onto the stand, or to the absence of the scanner on the stand, or to the act of removing the scanner from the stand. Alternatively, it could be sensitive to the user's hand which will be holding the scanner in the hand-held mode; it could, for example, be sensitive to the pressure of the user's hand by way of a microswitch on the housing.

The scanner will, in the preferred embodiment, incorporate mechanical scanning means such as a rotating/oscillating mirror or other optical device for scanning the beam across the indicia. It will also preferably include electronic (microprocessor) decoding means which is arranged to receive signals representative of the reflected beam, and to recover from those reflected signals the information which was encoded within the indicia. The optimization for the first working range and for the second working range may incorporate either an optimization of the mechanical scanning means, or an optimization of the decoding means, or both. For example, the mechanical scanning means could be optimized by changing the focus and/or magnification of the scanner optical system to ensure that the scanning pattern is properly effective at the desired working range, and to ensure that the returning light beam is properly focused onto the detectors. Alternatively, or in addition, the decoder software may use a different, or an amended algorithm for each working range, thereby allowing for the fact that a distant indicia will appear to have much more closely spaced bars and spaces than a nearby indicia.

The invention extends to any one or more of the above features, either taken alone or in any compatible combination.

BRIEF DESCRIPTION OF THE DRAWINGS

The invention may be carried out in a number of ways and one specific embodiment will now be described, by way of example, with reference to the accompanying drawings, in which.

DETAILED DESCRIPTION OF THE PREFERRED EMBODIMENTS

Figure 4:
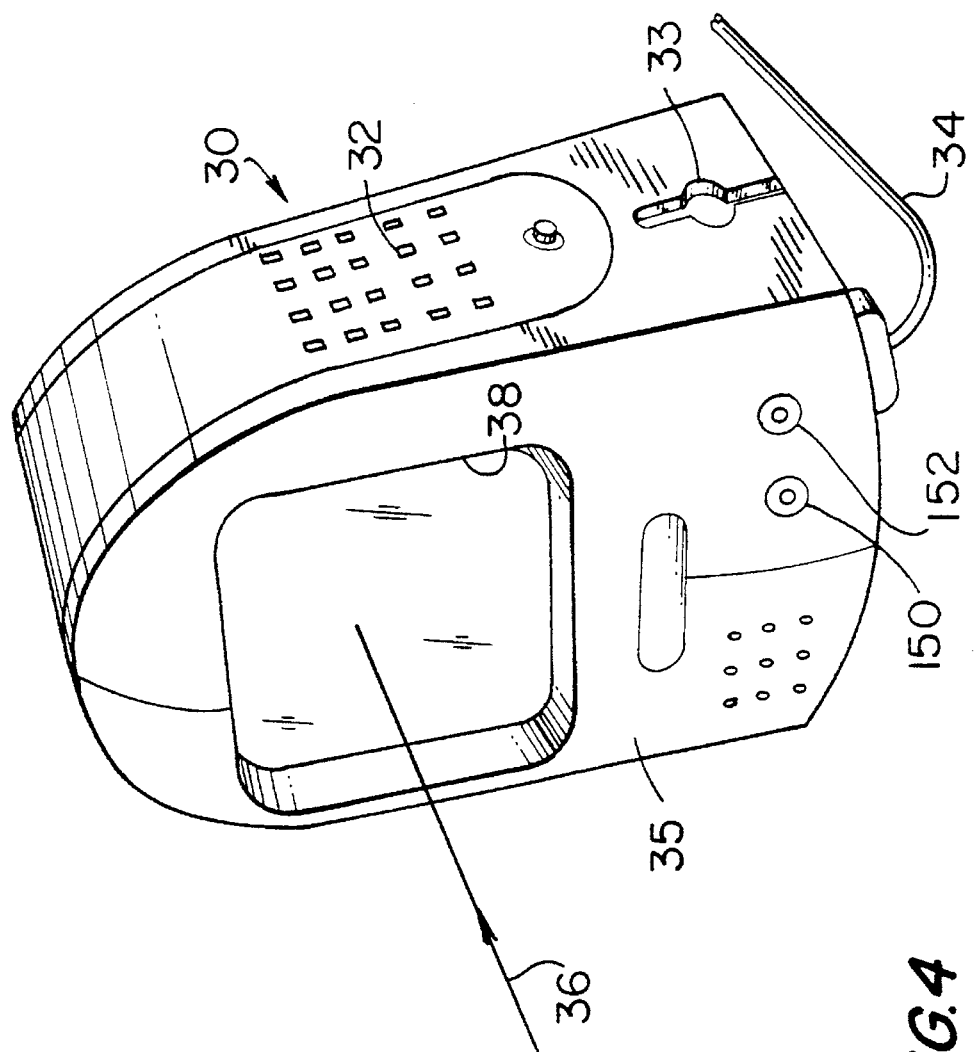
FIG. 4 shows further details of the third embodiment.

Turning first to FIG. 4, there is shown the preferred scanner embodying the present invention. The scanner 30 has a manually graspable portion 32, enabling the scanner easily to be held in the hand when it is being used in hand-held mode, and a mounting portion 33 for use in hands-free mode. The front face 35 of the scanner has an exit window 38, through which emerges the scanning beam 36. The scanner is preferably an omni-directional scanner forming a hatched scanning pattern 40. The pattern 40 is directed at a barcode symbol 42 to be read, on an article or package 44. Because of the multi-directional nature of the hatched pattern 40, the exact angle at which the barcode symbol 42 is presented to the scanner is not of particular importance: the symbol will be read in any orientation.

The information which is read from the barcode symbol 42 is passed along a data line 34 to a point-of-sale unit or cash register (not shown).

Figure 5:
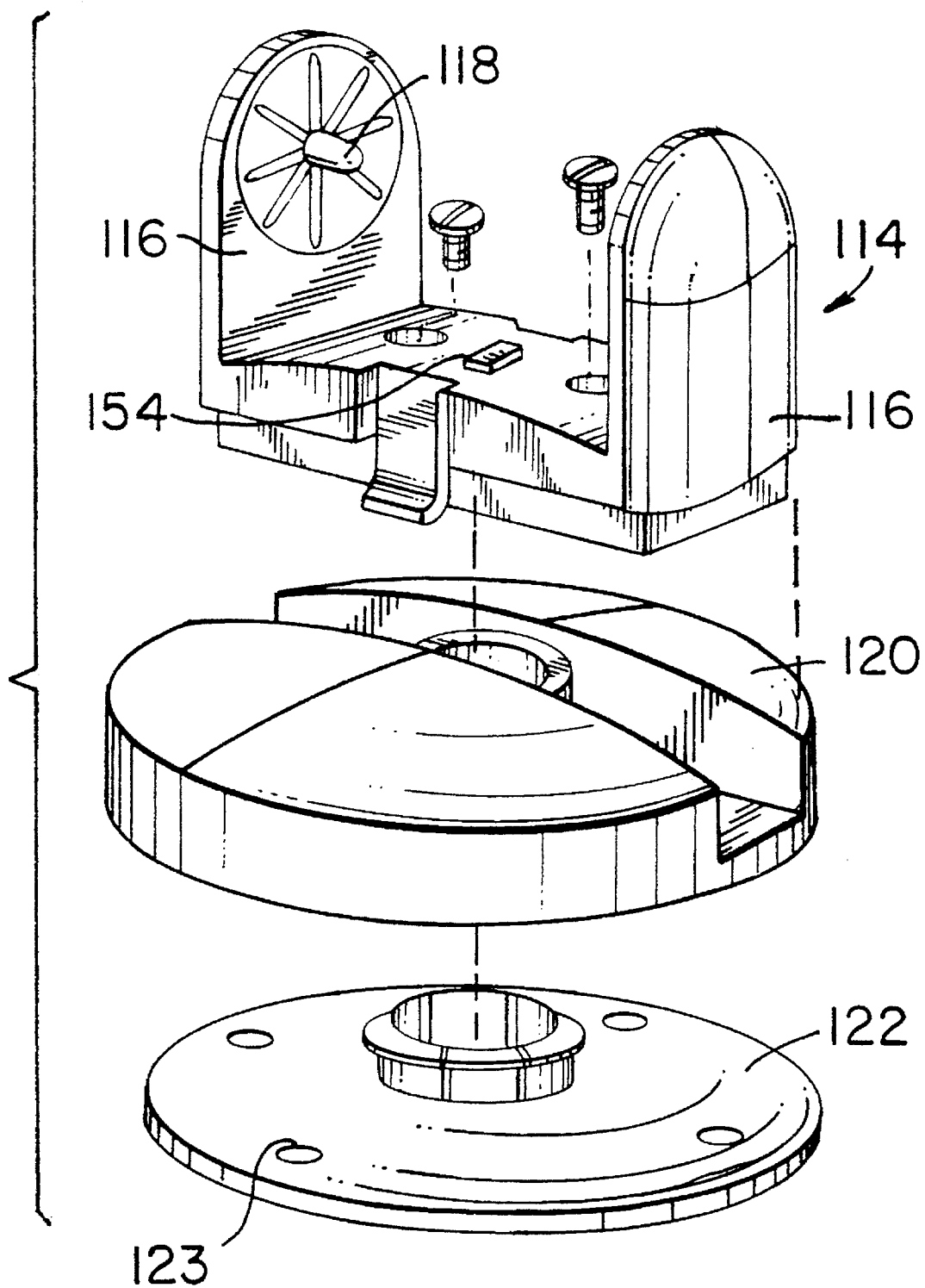
FIG. 5 shows a preferred stand for the scanner.

The preferred stand for the scanner of FIG. 4 is shown in FIG. 5. It comprises a base portion 122 having screw holes 123 by which the base unit may be dominantly secured to a work surface (not shown). Mounted for rotation on the base unit 122 is an intermediate support 120, and mounted to that is a trunnion mounting 116. The trunnion mounting has a pair of trunnions 118, which are arranged to be received within mounting apertures 33 (FIG. 4) of the scanner. When the scanner is mounted on the stand, it may be pivoted to a suitable angle at the trunnions, and it may also be rotated about vertical axis by rotating the intermediate support 120.

Figure 1:
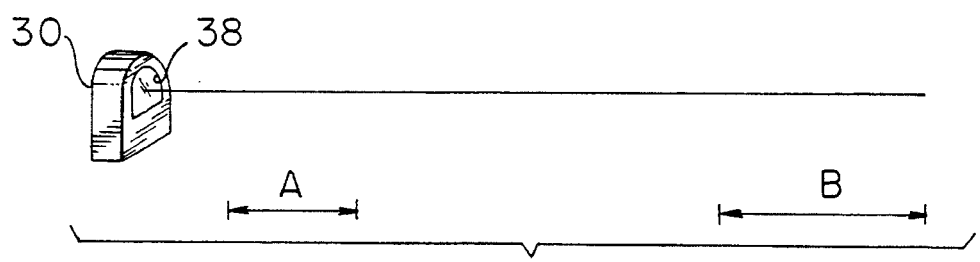
FIG. 1 illustrates schematically the two working ranges A and B of a scanner embodying the present invention.
Figure 2:
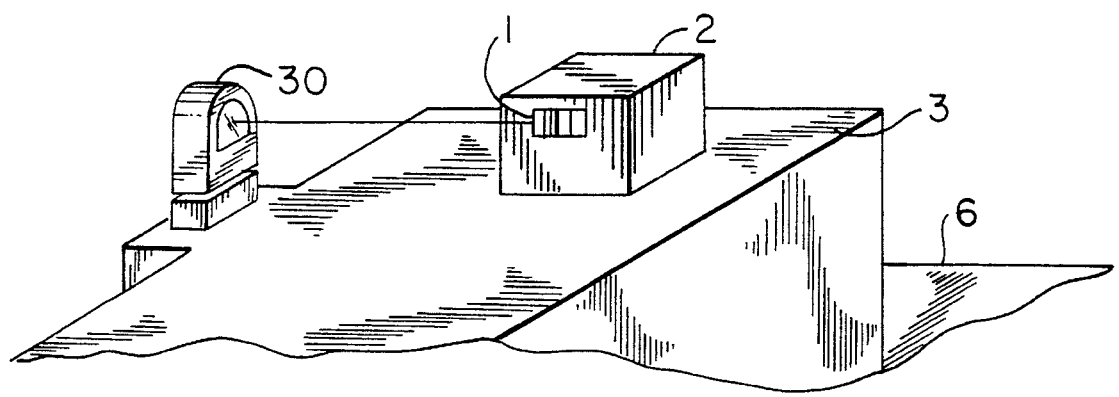
FIG. 2 shows the scanner of FIG. 1 operating in hands-free mode.

The operating software within the scanner is pre-programmed to enable the scanner to operate efficiently at two separate working ranges: a first, close, working range A, and a second, distant, working range B. See FIG. 1.

The arrangement is such that when the scanner is positioned on a stand it is used to scan barcode symbols 1 on packages 2 which pass close by the scanner on a conveyor or checkout counter 3. The working range A is chosen such that all packages on the counter-top 3 fall within that range.

Figure 3:
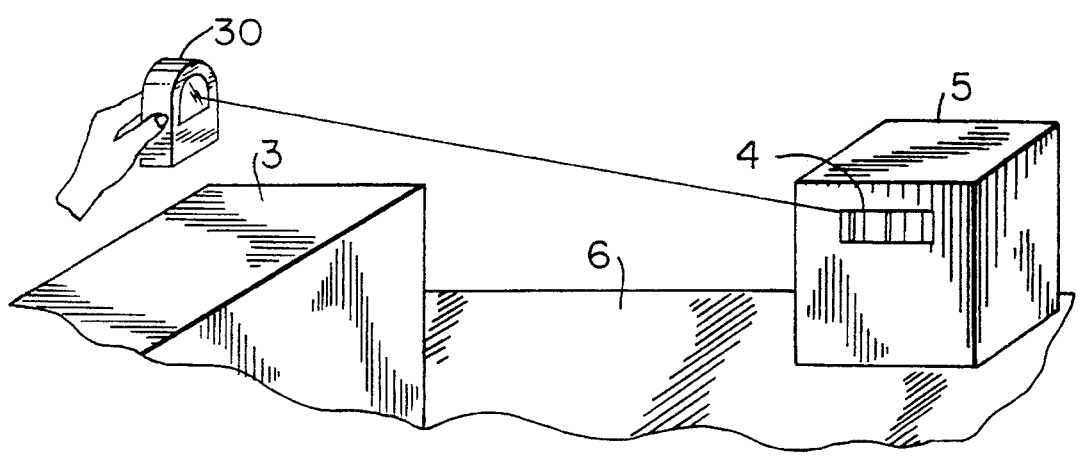
FIG. 3 shows the scanner of FIG. 1 operating in hand-held mode.

The checkout operator may, however, occasionally need to scan items which are too bulky or heavy to be easily placed on the counter-top; see FIG. 3. In that event, the user removes the scanner from the stand and operates it in hand-held mode. The scanner is merely manually aimed by the user at a barcode symbol 4 on the bulky package 5, which as shown in FIG. 3 may be sitting on the floor 6 on the far side of the checkout counter 3. The scanner software is arranged so that, in this case, the distance between the scanner 30 and the barcode symbol 4 will fall within the far working range B.

There is no need for the user manually to switch between the near range A and the far range B. A non-contact reed switch or Hall effect switch 154 (FIG. 5) automatically determines whether or not the scanner is mounted on the stand. If the scanner is so mounted, the switch is actuated, thereby instructing the scanner software to expect a barcode symbol within the near working range A. When the scanner is used in hand-held mode, the switch will not be actuated, thereby instructing the scanner software to expect a barcode symbol within the far working range B.

It will be evident that the exact type of switch is not of crucial importance to the overall inventive concept, and that various types of contact or non-contact switches could be devised. The only requirement is that the scanner should be able automatically and without user intervention to determine whether it is being used in hand-held mode, or whether it is being used in hands-free mode mounted on the stand.

The predefined working ranges A and B may be preset before the scanner leaves the factory. Alternatively, the user may be provided with working range adjustment means such as knobs 150,152 (FIG. 4) by which he can manually adjust the working ranges according to the requirements of his particular situation. Many other ways of enabling the user to change the working ranges may of course be envisaged, for example by providing the scanner with a screen, and enabling the user to choose from a menu which is displayed on the screen; or by allowing the user to change the settings via a cash register, with the necessary control signals being passed down to the scanner by the lead 34.

The scanner may, in addition, have specific scanning or decoding characteristics associated therewith, for example operability for a specific symbology or printing density. These characteristics may be defined, or changed, through the use of manual control switches associated with the scanner, or alternatively a cash register to which the scanner is connected.

The scanner described above may be implemented within a self-contained data acquisition system, including one or more additional components such as keyboard, display, printer, data storage, application software and data bases. Such a system could also include a communications interface to permit the data acquisition system to communicate with other components of a local area network or with a telephone exchange network, either through a modem or an ISDN interface, or by low-power radio broadcast from the scanner to a stationary receiver.

While a preferred embodiment has been described in detail above, it should be apparent that the disclosure and teachings of the present invention will suggest many alternative designs to those skilled in the art. Accordingly, it should be appreciated that the specific features set out above in connection with the preferred embodiment are not intended to be limiting of the overall inventive concept, which is to be construed in accordance with the appended claims.

What is claimed is:

1. An optical scanner for scanning indicia having regions of differing light reflectivity, the scanner being usable in a first mode in which it is held in the hand of a user and in a second mode in which it is supported by a fixed support, the scanner comprising:

(a) a scanner body;

(b) scanning and decoding means for emitting a scanning light beam from the scanner body towards an indicia to be read, for receiving light reflected from the indicia and for decoding the indicia based on the said reflected light;

(c) mode detection means arranged automatically to determine whether the scanner is being used in the first mode or in the second mode;

(d) control means actuated by the mode detection means to optimize the scanning and decoding means to read the indicia in a first working range in the first mode and in a second working range in the second mode; and (e) field adjustment means for enabling the user to manually and independently adjust each working range.

2. A scanner as claimed in claim 1 in which the first working range is a relatively near range and the second working range is a relatively distant range.

3. A scanner as claimed in claim 1 in which the second working range is a relatively near range and the first working range is a relatively distant range.

4. A scanner as claimed in claim 1 in which the mode detection means comprises a contact switch on the housing.

5. A scanner as claimed in claim 1 in which the mode detection means comprises a non-contact switch.

6. A scanner as claimed in claim 5 in which the mode detection means comprises a reed switch.

7. A scanner as claimed in claim 5 in which the mode detection means comprises a Hall effect switch.

8. A scanner as claimed in claim 1 in which the mode detection means comprises a switch which is actuated when the housing is placed onto a fixed support in the second mode.

9. A scanner as claimed in claim 1 in which the mode detection means comprises a switch which is actuated by the pressure of the user's hand on the housing in the first mode.

10. A scanner as claimed in claim 1 in which the scanning and decoding means comprises mechanical scanning means and electronic decoding means, the control means being arranged to optimize the mechanical scanning means to read the indicia in the first working range in the first mode and in the second working range in the second mode.

11. A scanner as claimed in claim 1 in which the scanning and decoding means comprises mechanical scanning means and electronic decoding means, the control means being arranged to optimize the electronic decoding means to read the indicia in the first working range in the first mode and in the second working range in the second mode.

12. A scanner as claimed in claim 1 including a stand which is arranged to support the housing in the second mode, said stand including a base stationarily mounted on a support surface, a holder for supporting the body for tilting movement about a first axis, and an intermediate support between the base and the holder for rotating the body about a second axis generally perpendicular to said first axis.

13. A scanner as claimed in claim 1 comprising a barcode scanner.

14. A scanner as claimed in claim 13 comprising an omni-directional scanner capable of reading a barcode symbol in substantially any angular orientation.

15. A scanner as claimed in claim 1 in which the field adjustment means includes a pair of knobs on the scanner body.

16. A method of scanning an indicia having regions of differing light reflectivity, the method being operable in a first mode in which a scanner is held in the hand of a user and in a second mode in which the scanner is supported by a fixed support, the method comprising the steps of:

(a) emitting a scanning light beam from the scanner body towards an indicia to be read, receiving light reflected from the indicia and decoding the indicia based on the said reflected light;

(b) automatically determining whether the scanner is being used in the first mode or in the second mode;

(c) on the basis of the said determination, optimizing the scanner for reading the indicia in a first working range in the first mode and in a second working range in the second mode; and manually and independently adjusting each working range.

17. A method as claimed in claim 16 in which the first working range is a relatively near range and the second working range is a relatively distant range.

18. A method as claimed in claim 16 in which the second working range is a relatively near range and the first working range is a relatively distant range.

19. A method as claimed in claim 16 in which the optimizing step comprises optimising mechanical scanning means within the scanner.

20. A method as claimed in claim 16 in which the optimizing step comprises optimising electronic decoding means within the scanner.

* * * * *